(12) United States Patent
Bandou et al.

(10) Patent No.: US 7,191,814 B2
(45) Date of Patent: Mar. 20, 2007

(54) RESIN FILM COATED HEAT INSULATING AND SOUND ABSORBING MATERIAL, AND METHOD AND EQUIPMENT FOR MANUFACTURING THE MATERIAL

(75) Inventors: Takashi Bandou, Tokyo (JP); Masataka Yasu, Tokyo (JP); Takashi Mashimo, Tokyo (JP)

(73) Assignee: Asahi Fiber Glass Company, Limited, Tokyo (JP)

( * ) Notice: Subject to any disclaimer, the term of this patent is extended or adjusted under 35 U.S.C. 154(b) by 221 days.

(21) Appl. No.: 10/481,879

(22) PCT Filed: Mar. 28, 2003

(86) PCT No.: PCT/JP03/03971

§ 371 (c)(1),
(2), (4) Date: Dec. 31, 2003

(87) PCT Pub. No.: WO03/083826

PCT Pub. Date: Oct. 9, 2003

(65) Prior Publication Data

US 2004/0166754 A1 Aug. 26, 2004

(30) Foreign Application Priority Data

Mar. 29, 2002 (JP) ............................. 2002-096594

(51) Int. Cl.
*B29C 65/00* (2006.01)
*B65C 9/00* (2006.01)
*E04B 1/78* (2006.01)
*E04B 1/84* (2006.01)
*E04B 1/88* (2006.01)

(52) U.S. Cl. .................. 156/522; 156/308.4; 156/265; 156/251; 156/515; 156/301; 156/302

(58) Field of Classification Search ................ 156/515, 156/522, 530, 251, 301, 302, 265
See application file for complete search history.

(56) References Cited

U.S. PATENT DOCUMENTS 3,679,509 A * 7/1972 Fielibert ..................... 156/182
5,714,033 A * 2/1998 Hayashi et al. .......... 156/380.5

FOREIGN PATENT DOCUMENTS

| JP | 8-197667 | 8/1996 |
| JP | 09-156003 | 6/1997 |
| JP | 2000-85011 | 3/2000 |
| JP | 2001-140371 | 5/2001 |

* cited by examiner

*Primary Examiner*—Linda Gray
(74) *Attorney, Agent, or Firm*—Oblon, Spivak, McClelland, Maier & Neustadt, P.C.

(57) ABSTRACT

A resin film is provided wherein distortions generated at ear portions of films at shorter sides of a resin film coated heat insulating/sound absorbing material can be eliminated. The front and rear surfaces and both side surfaces in the direction of longer sides of the inorganic fiber mats are covered with band shaped resin films in a state that a predetermined spacing is provided between the mats, and the resin films are cut at a portion between the mats by a cutting blade along a direction of shorter sides in a state that the films are pressed by a pressing member, the resin films are pressed by the pressing member having film setting portions at both ends of a bottom surface thereof, whereby the slopes of the film setting portions prevent the ear portions of the resin films at the cutting portion from spreading sideways.

6 Claims, 6 Drawing Sheets

RESIN FILM COATED HEAT INSULATING AND SOUND ABSORBING MATERIAL, AND METHOD AND EQUIPMENT FOR MANUFACTURING THE MATERIAL

TECHNICAL FIELD

The present invention relates to a resin film covered heat insulating/sound absorbing material constituted by covering an inorganic fiber mat with resin films to prevent inorganic fibers from dispersing; a process and an apparatus for producing it.

BACKGROUND ART

Inorganic fiber mats (hereinafter, they may be referred to simply as mats) made of inorganic fibers such as glass wool, rock wool or the like have widely been used as a heat insulating/sound absorbing material for, e.g., houses. It is known that the entire surface of an inorganic fiber mat is covered with resin films when the mat is used as a heat insulting/sound absorbing material, in order to eliminate an irritating feeling to workers due to the dispersion of inorganic fibers broken off by handling during transportation, construction or the like, and to protect the inorganic fiber mat from moisture.

The heat insulating/sound absorbing material is produced by supplying inorganic fiber mats each cut to have a predetermined size to a band-shaped continuous resin film with a predetermined space between the mats, covering the front and the rear surfaces and both side surfaces along the longer sides of the mats, and cutting the resin films at portions between the mats to cover both side surfaces along shorter sides of the mats with the resin films.

Namely, for example, JP-A-09-156003 discloses a process for producing a heat insulating/sound absorbing material, comprising covering inorganic fiber mats each cut to have a predetermined size with a single or two band-shaped resin films in a manner that a predetermined space is provided between the mats, bonding the resin films at their bonding surfaces along the longer sides of the inorganic fiber mats, and cutting the resin films at portions between the mats by a cutting apparatus.

Also, the JP-A-09-156003 discloses specifically a cutting apparatus for the process. The cutting apparatus has the substantially same principle as the cutting apparatus of the present invention shown in FIG. 3 in that the resin films are cut in a pressed state. Namely, the cutting apparatus comprises a cutting blade disposed between two conveyors for conveying organic fiber mats covered with resin films, and perpendicularly to a conveying line of these conveyors, and a pair of pressing plates disposed at both sides of the cutting blade. Further, at underneath positions corresponding to the pair of pressing plate, a pair of receiving plates are disposed, whereby the resin films are cut at portions between the mats by moving the cutting blade down in a state that the resin film are pressed against the receiving plates by the pressing plates.

However, since a pressing plate 7 of the conventional cutting apparatus has a flat bottom surface as shown in FIG. 12, when the pressing plate 7 is moved down to press the resin films against a receiving plate 7, portions to be cut of the resin films are uniformly pushed by the flat bottom surface of the pressing plate. On the other hand, since both side fringes of the front side film 6a are bonded to the rear side film 6b by an adhesive 8, and air is included in the space enclosed by the front side film 6a and the rear side film 6b, both ear portions of the front side film 6a are pushed out sideways as shown in FIG. 12, when the front side film 6a is pressed by the pressing plate 7. When the films are further pressed by the pressing plate 7, the ear portions of the front side film 6a are further spread to finally be in a state as shown by the chain double-dashed lines, and may protrude outwardly from the extensions 14 of the rear side resin film at longer sides of the heat insulating/sound absorbing material. The front side film 6a and the rear side film 6b are cut by the cutting blade in this state, and at the same time, extensions of the front side film 6a and the rear side film 6b are bonded with an adhesive 8.

Accordingly, distortions 12 are formed at the ear portions of the extensions 15 of the resin films at shorter sides of the cut heat insulating/sound absorbing material. The distortions 12 become larger as the inorganic fiber mat is thicker, and may extend to the outside of the extensions 14 of the rear side film 6b. Accordingly, a conventional resin film covered heat insulating/sound absorbing material has not only a problem that its external appearance is bad, but also a problem in that the distortions 12 become obstacles when the heat insulating/sound absorbing material is inserted into a gap or space between columns of a building and the workability of the construction is thereby deteriorated.

Further, in order to improve the productivity, resin film covered heat insulating/sound absorbing material is generally produced so that an inorganic fiber mat having a large width and formed by collecting fibers, is cut along a longitudinal direction at first as illustrated in FIG. 14 to be divided in the width direction into, for example, three strips, the mat strips arranged in three rows are cut along cutting lines 13 to have a predetermined size in order to cover six surfaces of each mat with resin films and, three rows of the mats thus produced are arranged and covered with resin films 6. Heretofore, the apparatus is so constructed that the resin films covering the plurality of the rows of the mats are cut by a single cutting blade all at once, whereby the cutting can be performed even if distortion of the resin films of neighboring rows are overlapped.

However, since movements of inorganic fiber mats in the plurality of rows are irregular, displacements may be caused. Accordingly, although the resin film can be cut at a predetermined interval, the mats are often cut when the displacement is large. On the other hand, if the cutting apparatus for cutting the resin films is provided for each of the rows, and if the length of the cutting blade is increased considering the margin for the distortion, the spacing between the rows needs to be increased, and the width of the conventional producing apparatus is thereby increased.

The present invention has been made considering the above problems, and it is an object of the present invention to provide a heat insulating/sound absorbing material having no distortion that becomes obstacle at cutting portions of the resin films, a process and an apparatus for producing it.

DISCLOSURE OF THE INVENTION

The present invention provides the following heat insulating/sound absorbing material, the process and the apparatus for producing it in order to solve the above problems.
(1) In a resin film covered heat insulating/sound absorbing material comprising an inorganic fiber mat and resin films covering the mat;
the resin film covered heat insulating/sound absorbing material being characterizing in that
the resin films have extensions extending outwardly from end portions at longer sides and shorter sides of the inorganic fiber mat, and the extensions of the front and rear side resin films are bonded at the shorter sides of the inorganic fiber mat in a manner that the distortion of ear portions of the extensions at the shorter sides do not protrude outwardly from the extensions at the longer sides.

(2) The resin film covered heat insulating/sound absorbing material according to (1), wherein the inorganic fiber mat is covered with the front and rear side resin films, the front and rear side resin films are bonded at their mating surfaces with an adhesive, and ear portions of the extensions of the films at shorter sides of the inorganic fiber mat are bonded with an adhesive at inner portions adjacent to the mating surfaces bonded.

(3) In a process for producing a resin film covered heat insulating/sound absorbing material comprising:

covering front and rear surfaces and both side surfaces along the longer sides of a plurality of inorganic fiber mats cut to have a predetermined length, with resin films in a state that the mats are placed along the resin films of continuous band-shape with a predetermined spacing between the mats, cutting the resin films along a direction of the shorter sides of the inorganic fiber mats at portions between the inorganic fiber mats in a state that the resin films are pressed by a pressing member, and bonding mutually front and rear side resin films extending from the shorter sides of the inorganic fiber mats at the same time of the cutting step;

the process for producing a resin film covered heat insulating/sound absorbing material being characterized in that the resin films are pressed by a pressing member having film setting portions at both ends of its bottom surface, whereby the ear portions of extensions of the resin films at the shorter sides of the inorganic fiber mats are prevented from spreading sideways.

(4) The process for producing a resin film covered heat insulating/sound absorbing material according to (3), wherein at the time of covering the inorganic fiber mat with the front and rear side resin films, an adhesive is applied to the mating surface of the rear side resin film and the inner portion adjacent to the mating surface, extensions of the front and rear side resin films at the shorter sides of the inorganic fiber mats are pressed by the pressing member having film setting portions at both ends of its bottom surface, so that the ear portions of the extensions of the front and rear side resin films are bonded by the adhesive applied to the inner portions adjacent to the mating surfaces.

(5) The process for producing a resin film covered heat insulating/sound absorbing material according to (3) or (4), wherein an inorganic fiber mat formed by collecting inorganic fibers is cut in a longitudinal direction to form a plurality of inorganic fiber mat strips, followed by cutting them in a width direction in a state such that they are disposed in parallel to form a plurality of rows of inorganic fiber mats each having a predetermined length; the inorganic fiber mats are covered with band-shaped resin films, and the resin films are cut for each plurality of rows in a state that they are pressed at portions between the plurality of inorganic fiber mats by a pressing member.

(6) In an apparatus for producing a resin film covered heat insulating/sound absorbing material, comprising two conveyers placed with a space between the conveyers to convey an inorganic fiber mat covered with band-shaped resin films, a cutting blade provided between the conveyers so as to be perpendicularly to the conveying line of the conveyers, pressing members disposed on both sides of the cutting blade, and receiving plates disposed under the respective pressing members, wherein the resin films are cut at portions between the inorganic fiber mats by the cutting blade in a state that the films are pressed against the receiving plates by the pressing members to produce a resin film covered heat insulating/ sound absorbing material, the apparatus being characterized by further comprising a film setting portion provided at each of both ends of the bottom side of the pressing members, for pressing the resin films to prevent the ear portions of the resin films from spreading sideways.

(7) The apparatus for producing a resin film covered heat insulating/sound absorbing material according to (6), wherein the film setting portions are formed as a pair of slopes falling towards both ends of the bottom surface of each of the pressing members so that the bottom surface of each of the pressing members has a concave shape.

(8) The apparatus for producing a resin film covered heat insulating/sound absorbing material according to (7), wherein the angle of the slopes of the film setting portions is from 5 to 45 degrees.

(9) The apparatus for producing a resin film covered heat insulating/sound absorbing material according to (7) or (8), wherein the cutting blade and the pressing members are provided so as to be moved up and down in corporation with each other by a common single driving source, the cutting blade is supported and located at a position from 0 to 50 mm above the apex of the concave of the pressing members, the cutting member and the pressing members are moved down by the driving source, the resin films are pressed by the pressing members at first, and thereafter, the resin films are cut by the cutting blade.

(10) The apparatus for producing a resin film covered heat insulating/sound absorbing material according to any one of (6) to (9), wherein the pressing members are made of a highly elastic synthetic resin foam.

(11) The apparatus for producing a resin film covered heat insulating/sound absorbing material according to any one of (6) to (10), wherein the pressing members are made of an ether type polyurethane foam, having a hardness of from 200 to 300N.

BRIEF DESCRIPTION OF THE DRAWINGS

Various other objects, features and attendant advantages of the present invention will be more fully appreciated as the same becomes better understood from the following detailed description when considered in connection with the accompanying drawings in which like reference characters designate like or corresponding parts throughout the several views and wherein.

BEST MODE FOR CARRYING OUT THE INVENTION

Figure 1:
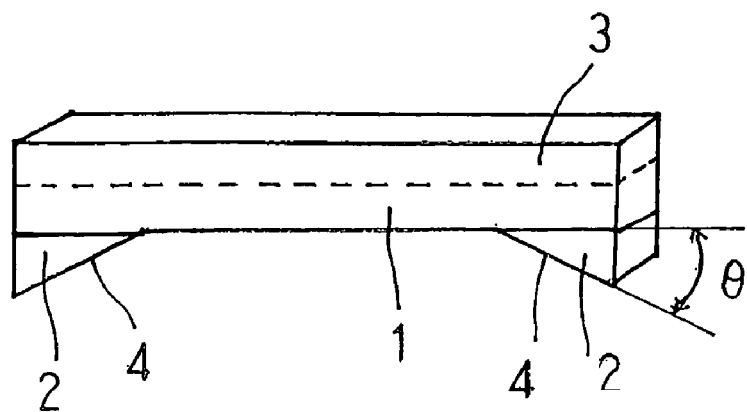
FIG. 1 is a perspective view of a preferred pressing member of the present invention.
Figure 2:
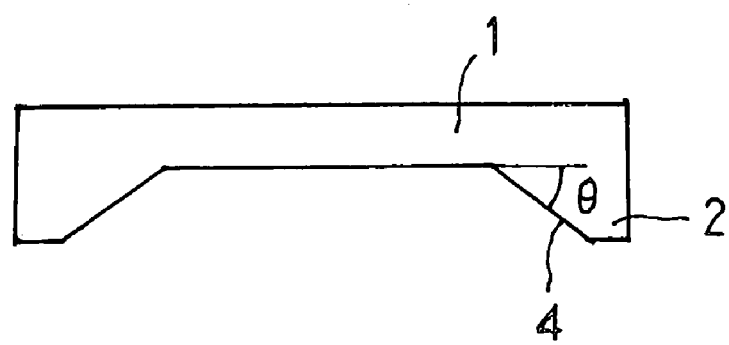
FIG. 2 is a front view of a pressing member of another embodiment of the present invention.

In the figures, there is shown a pressing member 1, a film setting portion 2, a supporting member 3, a slope 4, an inorganic fiber mat 5, a front side film 6a, a rear side film 6b, a pressing plate 7, an adhesive 8, a cutting blade 9, a conveyor 10, a receiving plate 11, a distortion 12, a cutting portion 13, an extension 14, 15, a supporting rod 18, a holding member 19, a cylinder 20, an operation rod 21, a bonding surface 23

The present invention is characterized in that a plurality of inorganic fiber mats cut into a predetermined length are arranged along continuous band-shaped resin films, namely in the longitudinal direction of the resin film, with spacing between the mats, covering four surfaces (bottom surface, top surface and both side surfaces along the longer sides) in a direction of the longer sides of the mats (moving direction), and the resin films are cut at portions between the mats in a state that the resin films are pressed by pressing members each provided with film setting portions at both ends of their bottom surfaces, whereby no large distortion occurs at ear portions of the extensions of the resin films at the shorter sides of the mats due to spreads of the resin films.

In the resin film covered heat insulating/sound absorbing material of the present invention, the resin films covering the inorganic fiber mat have extensions at the longer sides and the shorter sides of the inorganic fiber mat. These extensions are portions of resin films covering the top and bottom surfaces of the inorganic fiber mat, and are the portions extending outwardly from the ends of the inorganic fiber mat. The extensions are considered to be extremely useful for a construction since the heat insulating/sound absorbing material can be easily attached so as not to produce gaps in a building by fixing these extensions to the building.

The extensions at the shorter sides are formed by cutting resin films between which mats are arranged with spacings between them, at portions between the mats. Therefore, the extensions at the shorter sides usually mean portions (15 in FIG. 8) of the resin films covering a mat, which extend outwardly from the shorter sides of the mat, and both ends of the extensions form ear portions of the extensions.

Figure 14:
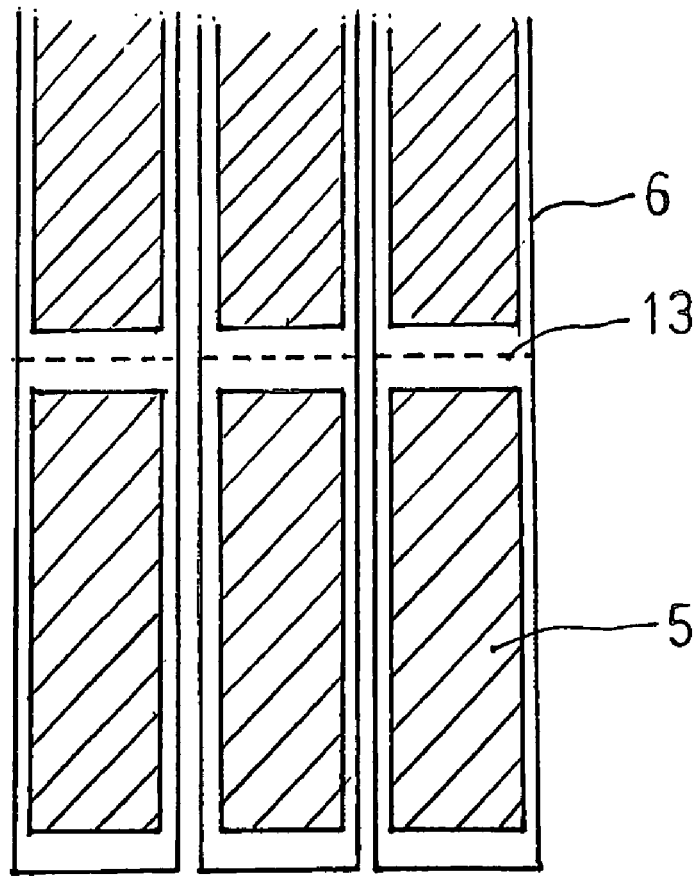
FIG. 14 is a plan view showing a process for producing a heat insulating/sound absorbing material by covering a plurality of rows of inorganic fiber mats with resin films.
Figure 15:
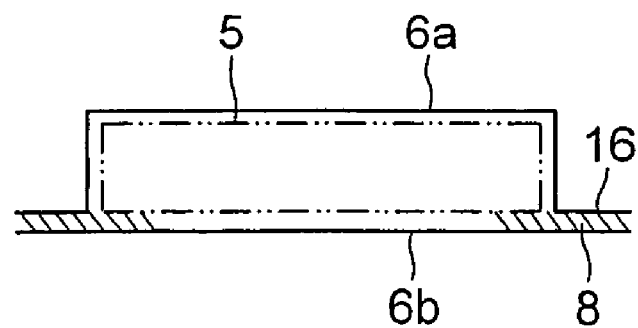
FIG. 15 is a schematic cross-sectional view showing another process for covering an inorganic fiber mat with two resin films.

In the present invention, the inorganic fiber mat is a mat formed by adding organic components (hereinafter, referred to as binder) having a thermosetting resin as its main component to inorganic fibers, collecting or piling up the inorganic fibers on a conveyor, and thermosetting the binder to form the fibers in a mat shape. The inorganic fibers are not particularly limited, and e.g. a glass wool or a rock wool used as a common inorganic fiber heat insulating/sound absorbing material can be employed. A glass wool is most commonly used. A detailed description of the inorganic fiber mat is omitted since the inorganic fiber mat itself is substantially the same as a conventional one. Further, conventionally known processes for producing inorganic fiber mats can be applied as they are. However, in order to improve the productivity, the inorganic fiber mats are usually so produced that the inorganic fibers are collected and formed into a mat shape, the mat is cut along a longitudinal direction as shown in FIG. 14 to divide into a plurality of strips, and cut in a width direction to obtain inorganic fiber mats having a predetermined length. However, the mat may be formed to have a width of the single heat insulting/sound absorbing material.

In the present invention, a resin film to be employed for covering a common inorganic fiber heat insulating/sound absorbing material may be employed. It may, for example, be a thermoplastic resin film such as a polyethylene resin, a polypropylene resin, a polyvinyl chloride resin, a polyvinylidene chloride resin, a polyester resin, a polycarbonate resin or a polyamide resin. Among these, a polyethylene resin is preferred in terms of heat sealing property, adhesiveness and cost.

Further, the resin film is employed in a form of a band. The form and the method of covering the inorganic fiber mat can be appropriately selected from several methods which have been known. For example, a method of covering the whole inorganic fiber mat by a single resin film, a method of inserting the inorganic fiber mat into a tubular formed resin film, or a method of employing two resin films and covering the top and the bottom surfaces of the mat with the top and rear side film respectively, are mentioned. Among these, the method of covering the mat with two resin films from the top and the bottom, is excellent in terms of workability and quality.

Further, bonding surfaces at the longer sides and the shorter sides of the resin films covering the inorganic fiber mat are bonded. It is preferred that the boding of longer sides of the resin films is performed before the resin film is cut, and the bonding at shorter sides is performed at a time of cutting. The bonding may be performed either with an adhesive or by a heat sealing. However, an adhesive is preferred in terms of the productivity. Further it is important to bond the resin films so that a non-bonded portion remains in the mutually bonded portion of the resin film to reserve outlet and inlet ports for air for compression at the time of packing and for recovering at the time of construction. The mutually non-bonded portion of the resin films can be formed in the extensions at a shorter side or a longer side of the inorganic fiber mat by either applying the adhesive or heat sealing to only a part in the width direction. Further, by applying the adhesive to the bonding surface in the longitudinal direction of the resin films discontinuously, the non-bonded portion can be formed also at the longer sides of the inorganic fiber mat in the same manner.

Further, in order to prevent the inorganic fiber mat from moving in the resin films, it is preferred that at the same time of mutually bonding the resin films, the inorganic fiber mat is partially bonded to the resin films by the adhesive in the same manner as the conventional method. In that case, it is sufficient that the adhesive is applied along the longitudinal direction of at least one of the resin films covering the front and rear sides of the inorganic fiber mat. With respect to the position to be applied, portions of the inorganic fiber mat corresponding to the ear portions, the center portion in the width direction of the inorganic fiber mat and the like are preferred. Further, the width of the adhesive to be applied is not particularly limited, but is preferably about from 50 to 150 mm. The adhesive and the method of applying it, are substantially the same as ones employed for packing the conventional inorganic fiber mats with resin films, and therefore, their descriptions are omitted.

In the present invention, the pressing members are provided at both sides of a cutting blade so as to be movable up and down so that at a time of cutting the resin films at a portion between the mats, the cutting portion of the resin films is uniformly pressed from the top to fix, whereby the cutting by the cutting blade can be easily performed. Further, receiving plates for supporting the resin films from the bottom are provided at portions underneath the respective pressing members. In this case, usually a pair of pressing members are provided at both sides of the cutting blade. However, a single pressing member having, at its central portion, a slit capable of letting the cutting blade move through, may be employed, and a receiving plate may be formed in the same manner as the pressing member.

The material of the pressing member is preferably an elastic body having a high restitution, and for example, a foam of polyurethane, polyethylene, polyolefin or polystyrene, or a highly elastic rubber such as a silicon rubber, a fluorine rubber, a rubber type sponge or a rubber type foam, is preferably employed as the material for the pressing member. In particular, a highly elastic foam is preferred and an ether type polyurethane foam is excellent in that it has a high elasticity, a high durability and a proper ductility. Here, the foam may be of a closed cell type or an open cell type. Further, in terms of the physical property of the pressing member, in order to obtain a predetermined elasticity and durability, the pressing member preferably has a density of 20 to 30 kg/m$^2$, a hardness of 200 to 300 N, a tensile strength of at lest 70 KPa, a ductility of at least 100% and a tear strength of at least 4.0 N/cm.

In the pressing member of the present invention, the bottom surface for pressing the resin films is not flat like the conventional one, but film setting portions are provided at portions for pressing the ear portions of the extensions at the shorter sides of the resin films. The film setting portions have a function of pressing the both ear portions of the resin films from lateral or diagonal directions to prevent the ear portions of the resin films from spreading sideways to form distortions when the resin films are pressed by the pressing member. In order to obtain this function, the film setting portions have slopes continuously falling toward the ends at their bottom surfaces. With these film setting portions, the bottom surface of a pressing member has a concave shape having a center portion caved in from the ends. Each of the slopes may be a straight slope or a curved slope, and the range of the slopes in the bottom surface of the pressing member is not limited. It is preferred that at least portions for pressing both ends or ear portions of the resin films are formed to have slopes. In the present invention, the pressing member having film setting portions at both ends of the bottom surface, means a pressing member having a concave portion wherein at least both ends of the bottom surface have slopes.

Further, the film setting portions are formed integrally with the pressing member and made of the completely same material as the pressing member unless there is any problem. However, if integral formation is difficult due to the shape of the film setting portions, or if it is preferred to make the film setting portion having a different physical property from the pressing member, film setting portions may be formed of the same or different material separately, and it may be bonded to the pressing member.

Now, embodiments of the present invention will be specifically described with reference to drawings. FIG. 1 is a perspective view of a preferred pressing member of the present invention. In FIG. 1, 1 designates a pressing member, 2 designates a film setting portion provided at both ends of the bottom surface of the pressing member 1, and 3 designates a supporting member adapted to be attached with the pressing member 1. The supporting member 3 is made, for example, of a structural material having a rigidity such as steel, so as to allow the pressing member 1 easily attached thereto by e.g. bonding.

The pressing member 1 in this example is made of an ether type polyurethane foam having a high restitution. For being easily understandable in this example, film setting portions 2, each having a triangular shape in vertical cross section, are formed in advance of the same material as the pressing member 1, and the film setting portions 2 are bonded to the bottom surface of the pressing member 1 so that slopes 4 of triangular shape face downwardly. The slopes 4 of the film setting portions 2 provided at both ends of the pressing member 1 each falls towards the end, and accordingly, the bottom surface of the pressing member 1 has a concave shape having a central portion caved in from both ends.

In this example, the film setting portions 2 are attached to the pressing member 1 afterwards. However, the film setting portions 2 can be integrally formed with the pressing member 1 as described above. Therefore, the pressing member 1 provided with the film setting portions 2 means both a pressing member 1 provided with the film setting portions 2 attached afterwards like this example, and a pressing member 1 having film setting portions 2 integrally provided at a time of forming the pressing member 1. The slopes 4 of the film setting portions 2 contact both ends or the ear portions of the resin films at early stages when the pressing member 1 move down towards the resin films, to prevent the both ends from spreading sideways.

For this purpose, the slope angle $\theta$ of the slopes 4 is preferably from 5 to 45 degrees, and more preferably from 10 to 30 degrees. If $\theta$ is less than 5 degrees, effect of preventing both ends of the resin films from spreading sideways can hardly be obtained. Further, if $\theta$ exceeds 45 degrees, when the pressing member 1 is pressed against the resin films, there occur not only a problem that both ends of the resin films are extremely concentrated to the vicinity of the film setting portions 2, but also a problem that the tips of the film setting portions 2 may be bent inwardly or outwardly without compressive deformation, and accordingly, it becomes difficult to sufficiently prevent the above-mentioned spread of the resin films, such not being preferred. If $\theta$ is from 1 to 30 degrees, the spread of the resin films is securely prevented, and the front side film for the inorganic fiber mat is uniformly drawn to seal in a good shape. Here, when the slopes 4 are curved, the slope angle can be substituted by the angle of the tangential line. Further, if the slope angle is not constant, it can be represented, for example, by the slope angle at the central portion of the slope.

Figure 3:
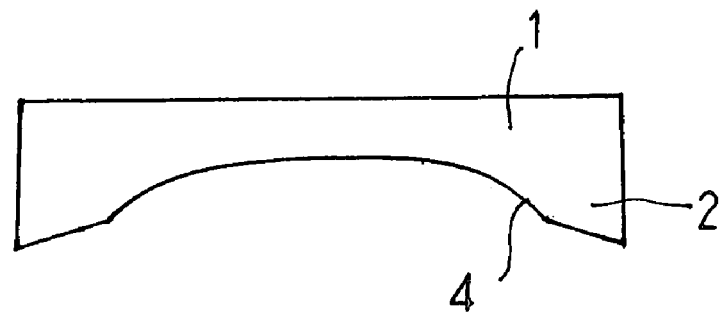
FIG. 3 is a front view of a pressing member of another embodiment of the present invention.
Figure 4:
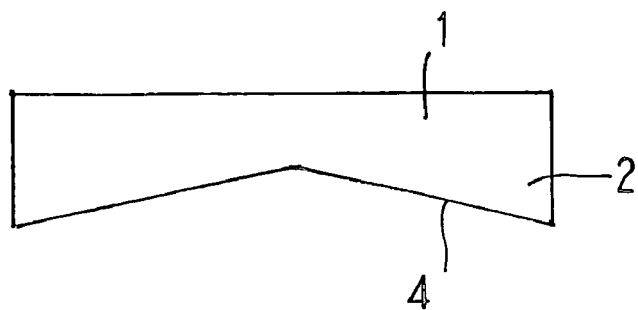
FIG. 4 is a front view of a pressing member of another embodiment of the present invention.
Figure 5:
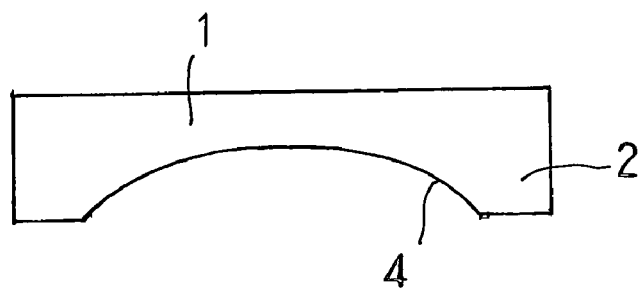
FIG. 5 is a front view of a pressing member of another embodiment of the present invention.

In the present invention, the film setting portions 2 having a shape shown in FIG. 1, are ones of preferred pressing members in that they are easily produced, and distortion is securely prevented. However, the film setting portions 2, namely the bottom surface of the pressing member 1, having other shapes can also be employed. FIGS. 2 to 5 exemplify typical examples of the shape. In the present invention, the shape of the pressing member can be changed within a range not deviating from the object of the film setting portions 2, and the slopes 4 of the film setting portions 2 may be partially or entirely curved as shown in FIG. 3 or FIG. 5.

Figure 6:
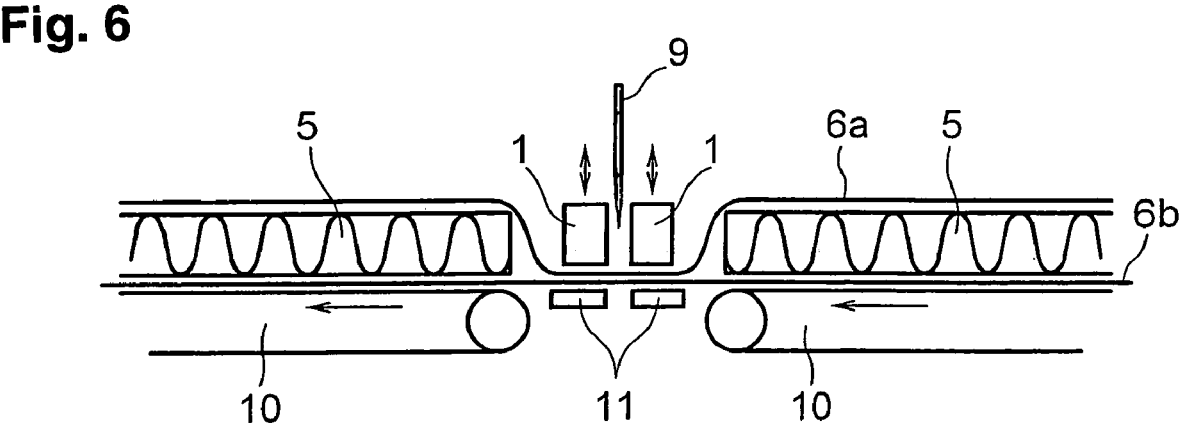
FIG. 6 is a schematic side view of a preferred apparatus for producing a resin film covered heat insulating/sound absorbing material of the present invention.

FIG. 6 is a schematic view of an apparatus for producing a resin film covered heat insulating/sound absorbing material, employing the pressing members 1 having film setting portions of the present invention. As the pressing members of this apparatus for pressing the films, pressing members 1 provided with the film setting portions 2 in FIG. 1 are employed. A predetermined space is provided between two conveyors 10 disposed in the moving direction of an inorganic fiber mat 5. A cutting blade 9 is provided between the conveyors 10 and in the direction of the width of the inorganic fiber mat 5, namely perpendicularly to the conveying line. Further, pressing members 1 are provided at both sides of the cutting blade, and receiving plates 11 are provided underneath the respective pressing members 1. The cutting blade 9 and the pressing members 1 are connected to a driving means, not shown. They usually stand by at the top position and move up and down at a time of cutting the resin films. Further, the pressing members 1 and the receiving plates 11 are preferably employed in pairs separated at left and the right positions as exemplified, in order to prevent an increase in size of the apparatus and to ensure pressing of the resin films.

Figure 10:
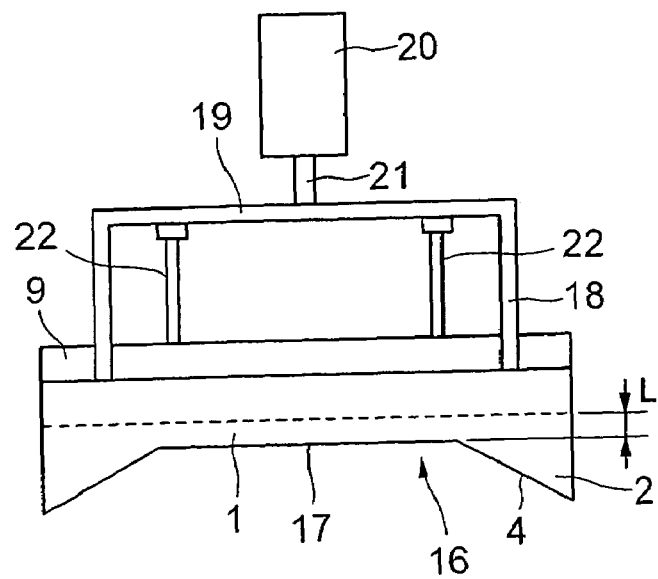
FIG. 10 is a front view of a film cutting unit of a preferred apparatus for producing a resin film covered heat insulating/sound absorbing material of the present invention.
Figure 11:
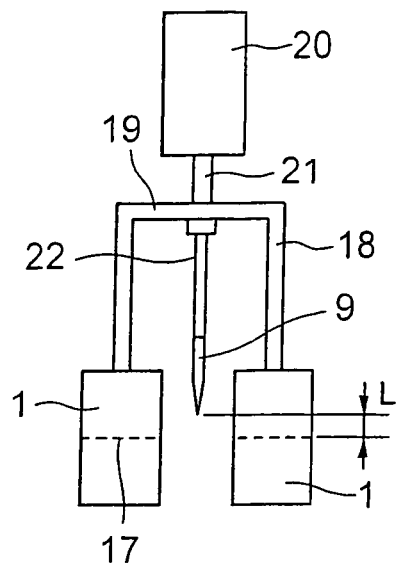
FIG. 11 is a side view of the film cutting unit in FIG. 10.
Figure 12:
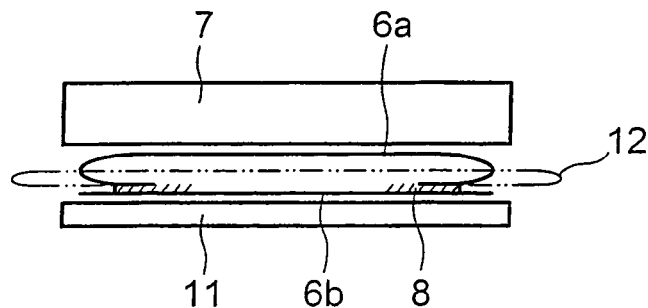
FIG. 12 is a schematic cross-sectional view of the pressing operation of the resin films by a conventional pressing member.
Figure 13:
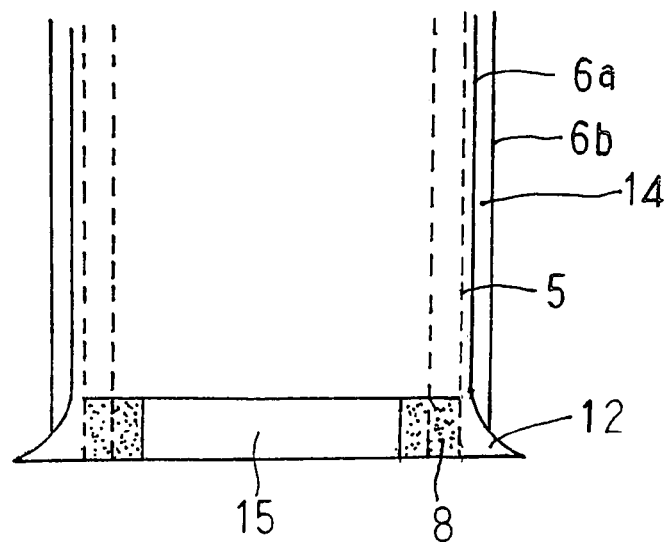
FIG. 13 is a plan view of a cutting unit for resin films of a conventional resin film covered heat insulating/sound absorbing material.

FIGS. 10 and 11 are views illustrating the cutting unit for the resin films in detail. FIG. 10 is a front view of the cutting unit for the resin films, and FIG. 11 is its right side view. A pair of pressing members 1 are each held by two supporting rods 18 at left and right positions, and attached to a holding member 19 in a state that there is a predetermined spacing between the pressing members as shown in FIG. 11. Further, the cutting blade 9 is attached to the holding member 19 by two rods 22 so that the cutting blade locates between the pair of pressing members 1 disposed in parallel. The holding member 19 is attached to the bottom end of the driving rod 21 of the cylinder 20, and constructed to be movable up and down by the cylinder 20.

As described above, since the cutting blade 9 and the pressing members 1 are connected to the holding member 19, the cutting blade 9 moves up and down together with the pressing members 1 by the operation of the cylinder 20. Namely, the cutting blade 9 and the pressing members 1 move up and down by a single driving source. Further, in order to cut the resin films by the cutting blade 9, the pressing members 1 and the cutting blade 9 are driven downward together by the cylinder 20 so that the pressing members 1 at first press the resin films, and they are further moved down by using the elastic deformation of the pressing members 1 to cut the resin films in a state that the cutting blade 9 is pressed by the pressing members 1.

Thus in the case where the pressing members 1 and the cutting blade 9 are connected so as to be moved in corporation by a single driving source, the positional relation between the pressing members 1 and the cutting blade 9 becomes important since they move up and down simultaneously. Namely, in order to cut the resin films securely and accurately by the cutting blade 9, the position (the height) of the cutting blade 9 supported in relation to the pressing members 1 significantly affects the cutting.

This issue is specifically described with reference to FIG. 10 and FIG. 11. The cutting blade 9 is preferably supported and located at a position located at distance L above an apex 17 of a concave portion 16 of the pressing members 1 as illustrated. In this case, the apex 17 is a point at which the concave portion 16 is most deeply caved in, and is usually at a central portion in the width direction of the pressing members 1. L may be selected from a range of from 0 to 50 mm, and is preferably from 5 to 35 mm. When L is smaller than 0 mm, the cutting blade 9 is located underneath the apex 17, the resin films are cut by the cutting blade 9 before the resin films are sufficiently pressed by the pressing members 1, and accordingly, the ear portions of the extensions of the resin films at shorter sides of the mat are not able to be sufficiently bonded. The purpose of making L to be preferably at least 5 mm is to cut the resin films in a state that they are further pressed by the pressing members 1 by utilizing the elasticity of the pressing members 1. If L exceeds 50 mm, the film setting portions 2 of the pressing members 1 are pressed in a state that they are bent in the flow direction by the flow of the production line, and accordingly, it becomes difficult to properly press the resin films, or a portion of the pressing members 2 bent and pressed may come underneath the cutting blade 9 to be cut by the cutting blade, such being not preferred.

Here, in the case where the pressing members 1 and the cutting member 9 are connected to the holding member 19 so that they are moved in corporation by a single driving source like this apparatus, the cutting blade 9 may be attached to the holding member 19 via a cylinder, not shown, whereby the resin films can be cut by moving the cutting blade 9 down independently from the movement of the pressing members 1 by this cylinder in a state that the resin films are pressed by the pressing members 1. In this case, the height of the cutting blade 9 in relation to the cutting members 1 is unnecessarily be so strictly adjusted as described above.

If the cutting blade 9 and the pressing members 1 are moved up and down by a common driving source, a single driving source is required and the apparatus can be simplified, such being preferred. However, the cutting blade 9 and the pressing members 1 may be moved up and down by their dedicated driving sources.

The inorganic fiber mats 5 whose four surfaces in a longitudinal direction are covered with a front side film 6a and a rear side film 6b (hereinafter, simply films 6a and 6b) in a state that a spacing is provided between the mats, are conveyed to the cutting unit of this apparatus by conveyors 10. When the cutting position of the films comes underneath the cutting blade 9, the pressing members 1 and the cutting blade 9 move down causing the pressing members 1 to press the films 6a and 6b against the receiving plates 11, and the films are cut by the cutting blade 9 in this state. Since the cutting can be completed instantly, the cutting can be usually done as the films are conveyed without stopping the conveyor. And, according to the effect of the pressing by the pressing members 1, the extensions of the films 6a and 6b at shorter sides of the inorganic fiber mats 5 are bonded with an adhesive applied to a part of these extensions in advance.

Figure 7:
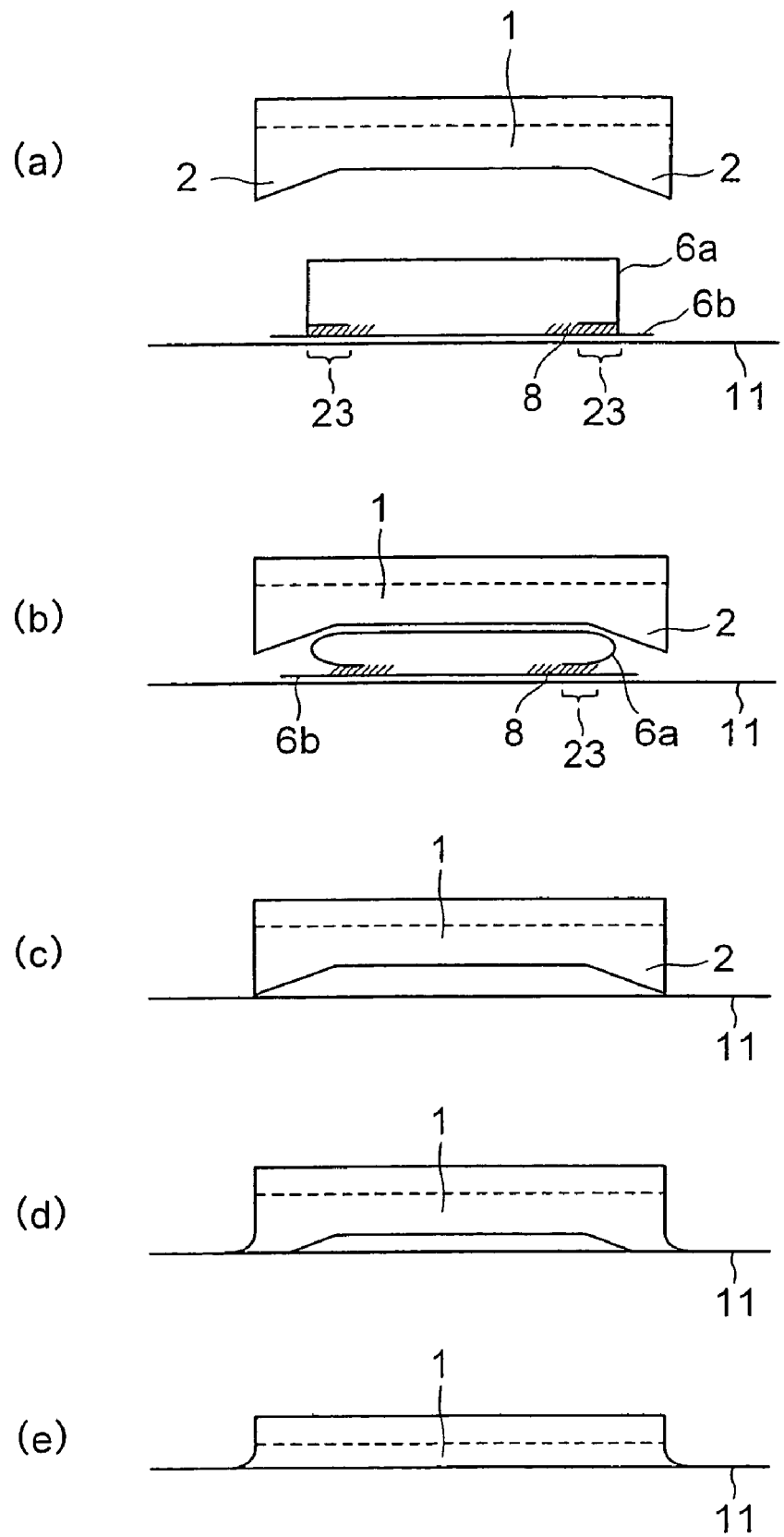
FIG. 7 shows in schematic form cross-sectional views pressing operations of the resin films in sequence by the pressing member of the present invention.

FIG. 7 illustrates the pressing operation, in sequence, of the resin films by a pressing member 1 at the time of cutting. Each of the views (c) to (e) shows only the pressing member 1, and the films 6a and 6b are not shown. The view (a) shows a state that the pressing member 1 starts moving down, and the portions to be cut of the films 6a and 6b are located on the receiving plate 11. Since the bonding surfaces 23 of the films 6a and 6b are already partially bonded along the longitudinal direction with adhesive 8, the films 6a and 6b are swelled by air contained inside. In this case, the adhesive 8 is applied in a state that it is substantially spread to the inside adjacent to the bonding surface 23 as well as the bonding surface 23 of the film 6b as shown in FIG. 7(a). Namely, the adhesive 8 is applied to the inside of the bonding surface 23 continuously from the bonding surface 23 or in proximity with the bonding surface 23. Thus, by applying the adhesive extensively to the inside of the bonding surface 23, the extensions of the films 6a and 6b at the shorter sides of the mat, more precisely the ear portions of the extensions, can be preferably bonded at a pressing step by the pressing members 1 which will be described next. The width of the inside portion neighboring the bonding surface 23 to which the adhesive 8 is extensively applied, is not particularly limited. Usually, it is preferred to apply it within a width of from about 50 to 150 mm from the bonding surface 23. If the adhesive is applied in this range inside the bonding surface 23, the film 6a can be bonded to the film 6b in a state that no distortion of the ear portions of the extensions of the film 6a occur outwardly.

The view (b) shows a state of the pressing member 1 being moved down to press the films 6a and 6b, wherein the film setting portions 2 are in contact with the ear portions of the film 6a so that slopes 4 of the film setting portions 2 prevent the film 6a from spreading sideways. When the pressing member 1 is further moved down, the bottom surface having a concave shape presses the film 6a while the film setting portions 2 prevent the film 6a from spreading sideways.

View (c) shows a state that tips of the film setting portions 2 of the pressing member 1 are in contact with a receiving plate 11, and view (d) shows a state that the pressing member 1 is moved further downwardly as it is elastically deformed. The film setting portions 2 after they are in contact with the receiving plate 11, are pressed mainly in the direction of the thickness in accordance with the downward movement of the pressing member 1. As a result, since both ear portions of the extensions of the film 6a are blocked in the lateral direction by the film setting portions 2 and confined in the concave portion of the pressing member 1, and accordingly, the ear portions are pressed against the receiving plate 11 as they are without swelling sideways. Therefore, large distortions like the conventional case will not be generated at the ear portions of the film 6a pressed by the pressing member 1. View (e) shows a state that the pressing operation is finished and the films are cut in this state.

Here, in the case where inorganic fiber mats are covered with two films 6a and 6b like this example, ends of the front side film 6a at the longer sides may be extended outwardly as extensions 16 from the ends of the inorganic fiber mats 5, and the bonding surfaces with the extensions of the rear side film 6b may be bonded with the adhesive 8 for covering.

Figure 8:
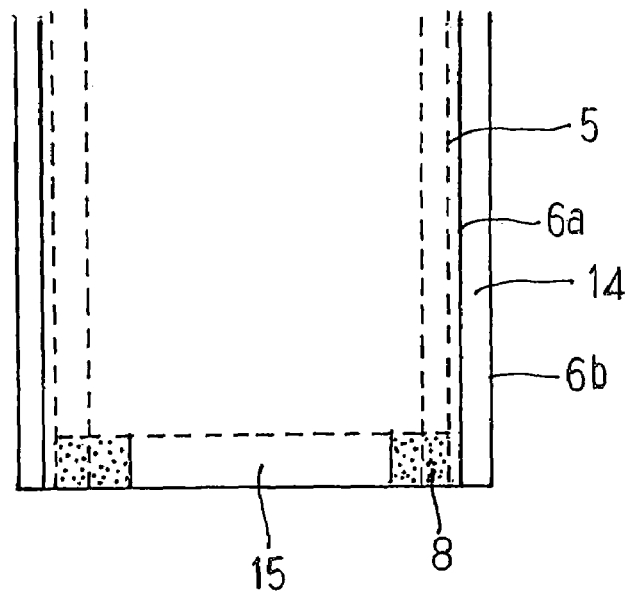
FIG. 8 is a plan view at a shorter side of a resin film covered heat insulating/sound absorbing material according to the present invention.
Figure 9:
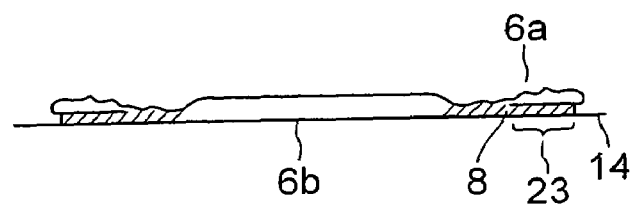
FIG. 9 is a front view of the shorter side in FIG. 8.

FIG. 8 is a plan view of a shorter side of a heat insulating/sound absorbing material constituted by an inorganic fiber mat covered with films 6a and 6b by the method of the present invention, and FIG. 9 is its front view (a view showing the end surface when it is looked from the bottom in FIG. 8). Since the ear portions of extensions of the film 6a at shorter sides of the heat insulating/sound absorbing material produced by the process of the present invention are prevented from spreading sideways by the film setting portions 2 even through they are pressed by the pressing member 1, distortions are hardly generated or extremely small even if they are generated as shown in FIGS. 8 and 9.

Since the adhesive 8 is applied to the inside portion of the film 6b neighboring the bonding surface 23 to the film 6a as described above, if the extensions of the films 6a and 6b at the shorter sides of the inorganic fiber mat 5 are pressed by a pressing member 1 having film setting portions at both ends of its bottom surface, the ear portions of the film 6a are prevented from spreading outwardly by the film setting portions as described above, and accordingly, as shown in FIG. 9, the film 6a is bonded to the film 6b in a state that little distortions of the ear portions are generated in the inside portion neighboring the bonding surface 23. And since the ear portions of the film 6a are thus bonded to the film 6b in a state that they are drawn, the ear portions of the extensions of the film 6a continue to be in a state of no distortions even after the pressure of the pressing member 1 is released.

Accordingly, ear portions of the extensions 15 of the film 6a at shorter sides of the heat insulating/sound absorbing material, have nearly the same shape as the film 6a at the longer sides of the heat insulating/sound absorbing material, and do not protrude outwardly from the extensions 14 at the longer sides of the heat insulating/sound absorbing material, or can be a negligible amount if they protrude as evident from FIG. 8. In the present invention, a state that distortions of the ear portions of the extensions do not protrude outwardly from the extensions at the longer sides of the inorganic fiber mat, means a state they do not substantially protrude in this manner.

Further, since the adhesive 8 is applied to both ends of the film 6b in advance at the same time as applying an adhesive 5 for bonding the films 6a and 6b, the extensions of the films 6a and 6b at the shorter sides are bonded by the adhesive 8 when they are pressed by the pressing member 1. The bonding is performed at both ends in this example. However, if the adhesive is applied in the longitudinal direction at the central portion in the width of the film 6b or other portions in advance, bonding can be performed at several portions in the direction of shorter sides of the mat.

INDUSTRIAL APPLICABILITY

According to the present invention, since there are no large distortions protruding sideways at ear portions of cutting portions of resin films in the direction of shorter sides of a resin film covered heat insulating/sound absorbing material, there are advantages not only that the external appearance is good but also that inserting of the heat insulating/sound absorbing material to a narrow gap or a space of e.g. a building becomes easy. Accordingly, the workability of construction can be improved and the quality of the construction can be improved.

Further, by pressing the resin films by pressing members provided with film setting portions at both ends of its bottom surfaces at a time of cutting, the ear portions of the resin films which tend to spread sideways can be pressed by the film setting portions, whereby a heat insulating/sound absorbing material of good quality having no distortions at the ear portions can be produced with low cost. Further, by thus preventing distortions protruding sideways from the ear portions of the resin films at the cutting portions, resin films covering a plurality of rows of the inorganic fiber mats divided as shown in FIG. 14 can be cut row by row, and the length of the cutting blade and the interval of neighboring rows can be made relatively small.

The invention claimed is:

1. An apparatus for producing a resin film covered heat insulating/sound absorbing material, comprising two conveyers placed with a space between the conveyers to convey an inorganic fiber mat covered with band-shaped resin films,
   a cutting blade provided between the conveyers so as to be positioned perpendicularly to a conveying line of the conveyers,
   pressing members disposed on both sides of the cutting blade, and
   receiving plates disposed under the respective pressing members,
   wherein the resin films are cut at portions between adjacent inorganic fiber mats cut by the cutting blade in a state that the films are pressed against the receiving plates by the pressing members to produce a resin film covered heat insulating/sound absorbing material, said resin films having ear portions; and
   a film setting portion provided at each of both ends of the bottom side of the pressing members, for pressing the resin films to prevent the ear portions of the resin films from spreading sideways.

2. The apparatus for producing a resin film covered heat insulating/sound absorbing material according to claim 1, wherein the film setting portions are formed as a pair of slopes sloped towards both ends of the bottom surface of each of the pressing members so that the bottom surface of each of the pressing members has a concave shape.

3. The apparatus for producing a resin film covered heat insulating/sound absorbing material according to claim 2, wherein the angle of the slopes of the film setting portions is from 5 to 45 degrees.

4. The apparatus for producing a resin film covered heat insulating/sound absorbing material according to claim 2 or 3, wherein the cutting blade and the pressing members are provided so as to be movable up and down in cooperation with each other by a common single driving source, the cutting blade is supported and located at a position from 0 to 50 mm above the apex of the concave of the pressing members, the cutting member and the pressing members are movable downward by the driving source, the resin films are pressed by the pressing members at first, and thereafter, the resin films are cut by the cutting blade.

5. The apparatus for producing a resin film covered heat insulating/sound absorbing material according to any one of claims 1 to 3, wherein the pressing members are made of an elastic synthetic resin foam.

6. The apparatus for producing a resin film covered heat insulating/sound absorbing material according to any one of claims 1 to 3, wherein the pressing members are made of an ether polyurethane foam, having a hardness of from 200 to 300 N.

* * * * *